June 26, 1951 D. R. CORMANY 2,558,208
TESTING APPARATUS FOR FLUID PIPE SYSTEMS
Filed March 18, 1947 6 Sheets-Sheet 1

Fig.1.

Inventor:
David R. Cormany,

Attorneys.

June 26, 1951 D. R. CORMANY 2,558,208
TESTING APPARATUS FOR FLUID PIPE SYSTEMS
Filed March 18, 1947 6 Sheets-Sheet 2

Inventor
David R. Cormany,
By Cushman, Darby & Cushman
Attorneys

June 26, 1951 D. R. CORMANY 2,558,208
TESTING APPARATUS FOR FLUID PIPE SYSTEMS
Filed March 18, 1947 6 Sheets-Sheet 6

Fig.10.

Inventor
David R. Cormany,
By Cushman, Darby & Cushman
Attorneys

Patented June 26, 1951

2,558,208

UNITED STATES PATENT OFFICE 2,558,208

TESTING APPARATUS FOR FLUID PIPE SYSTEMS

David Ross Cormany, Long Beach, Calif., assignor, by direct and mesne assignments, to W. E. Knapp and Paul Cavins, Jr., both of Long Beach, Calif.

Application March 18, 1947, Serial No. 735,305

20 Claims. (Cl. 73—37)

The present invention relates to apparatus for testing pipe systems, particularly oil well pipe and the connections or couplings thereof. More particularly, the apparatus is designed to be associated with an oil well in the immediate vicinity thereof, so that sections of oil well pipe may be tested as they are removed from the well in an expeditious manner, whereby defective sections may be appropriately marked and set aside while satisfactory sections are stacked in the derrick for further use.

While the apparatus is designed principally for use with flow tubing, it will be understood that by suitable and relatively minor modifications, other kinds of oil well pipe may be similarly tested. Furthermore, it will be apparent that certain aspects of the invention may be applicable to the testing of other than oil well pipe, and for operation at points other than in the immediate vicinity of an oil well.

The apparatus comprises a test unit which is positioned preferably on the derrick floor at one side thereof, and which receives and connects with the pipe to be tested, and a power unit which need not be located immediately at the derrick but which may be mounted on a truck so that it may be moved from place to place and conveniently used on various wells in a field. In a manner hereinafter described, stands or sections of oil well pipe are connected with the test unit and through a flexible hose or pipe connections between the test unit and the power unit, hydraulic pressure is applied to the interior of the pipe under control of the power unit, to determine if the pipe and its collars or connections are capable of holding the high pressures with which they may be used.

An object of the invention is to provide a test unit comprising an inlet barrel for the testing fluid adjustably mounted that it may be aligned with and threaded to the lower end of the pipe stand being tested.

Another object of the invention is to provide such a barrel arranged to be turned and movable toward the pipe in order to effect a threaded connection with the pipe section being tested, thus making unnecessary turning or other movement of the pipe section itself.

A further object of the invention is to provide a test unit including a valve adapted to be positioned in the upper end of the pipe stand being tested, which valve permits the release of air from the pipe as it is being filled with the testing fluid, but which closes under movement of the fluid in order to retain the latter in the pipe section for test purposes. Another object of the invention is to provide a method and apparatus for quickly and automatically filling the testing system and the pipe with fluid while expelling air therefrom, and thereafter supplying a small amount of fluid under high pressure to the system to effect the test.

Various other objects and advantages of the invention will become apparent as the description herein progresses.

In the drawings, which illustrate a now practical form of the apparatus of the invention, and certain modifications thereof, which drawings are not intended to restrict the invention except as defined in the appended claims:

In the art of oil and gas wells, it is well known that certain types of well pipe are removed from and inserted into the well many times during the drilling and completion of the well, in order to carry out various necessary operations in the well. It is highly desirable to avoid the use of defective or leaky oil well pipes or the joints which connect the sections of said pipes, and this is particularly true in the case of oil well tubing which is left as a permanent part of the well installation and which may be depended on to flow the well for many years. To a considerable extent, the maintenance of proper flow depends on the tightness of the tubing. In the case of gas wells, the desirability of having tight tubing and connections is obvious. More important, however, is the desirability of discovering and eliminating tubing sections which have been worn dangerously thin by action of a pump rod or the like, especially at crooked sections of the well. This invention is intended to apply sufficient pressure during test to break through and thus discover such weak points.

However, time-consuming operations on a well are most expensive, and present practices for testing tubing are so slow as to discourage the proper testing of pipe. Operators often prefer to chance the presence of defective sections of pipe rather than to incur the expense and trouble of testing it. Also, it is a hardship to require the derrick crew to perform proper testing with equipment which is difficult to set up and operate, and the use of which involves hard manual labor. The apparatus which I have developed is characterized by the ease and rapidity with which it may be set up and operated, and substantially all steps of my practice are automatic or power actuated, so that no hard manual labor is involved.

When oil well tubing is being removed from a well, one or more sections thereof, depending on the height of the derrick, are successively disengaged from the long string of pipe in the hole and are set up in vertical position in the side of the derrick, with appropriate racks provided for this purpose. When inserting the tubing into the well, these sections of pipe are successively attached to the upper end of the long string of pipe as it is lowered into the well. The present invention is concerned with the testing of one or more of these sections of pipe, either as they are removed from the string when the latter is being taken from the well, or as the sections are being attached to the long string of pipe going in. Most operators will prefer to test while coming out of the hole so that the defective sections may at that time be set aside and new sections conveniently placed in the racks for use when going into the well. Briefly, the present invention involves providing a testing barrel mounted on a suitable stand on the floor of the derrick, as at one side thereof, this barrel being connected with an adjacent source of hydraulic power. The stand of pipe to be tested which may be as great as 90 feet in length comprising several sections and intermediate and top end collar connections, and while still hanging from the elevator, or otherwise supported in substantially vertical position, is swung outwardly at its lower disconnected end, and by means forming part of the invention, the testing barrel is aligned with and tightly threaded to the lower end of the stand. At this time, or prior thereto when the top end was at derrick floor level supported by slips, an automatic valve is connected into the upper section of the pipe to be tested, this valve also forming part of the invention in its association with the other apparatus described. By manipulation of controls at the power unit positioned nearby or at some distance from the well, hydraulic pressure is applied through the test barrel and into the pipe stand, and by appropriate gauges and valves forming a part of the power unit, it is determined whether the pipe section unit is in proper condition for further use. The apparatus is characterized by simplicity in construction and operation, so that only a minimum of time is consumed in the test, same being capable of completion in as little time as 30 seconds.

In this connection, and as an important feature of the invention, the power unit is provided with means whereby a relatively great volume of liquid may be pumped into the pipe stand in a short period of time by one pumping system or mechanism, followed by the operation of a separate system or pressure pump, which need only supply a relatively small quantity of liquid, but which is adapted to rapidly build up the pressure in the pipe stand to the proper test. For example, any type of low pressure or volume pump, such as of the centrifugal type, may be employed to fill the system and the pipe stand with fluid, and a separate high pressure pump which need only move approximately a cubic inch of fluid per stroke may be used to build up to test pressure of 2,000 pounds per square inch, or other selected test pressure.

Figure 1:
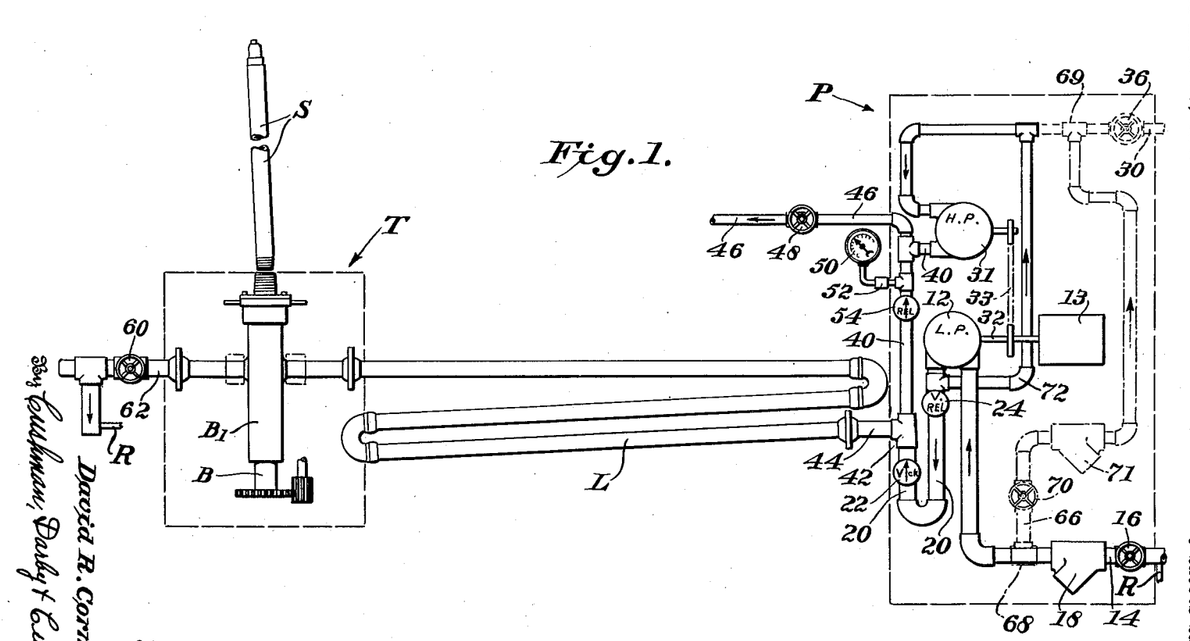
Figure 1 is a line diagram of the system and principal parts thereof, which constitute the power and test units.

Referring to Figure 1, the apparatus is shown in diagrammatic form, comprising two principal units, i. e., the power unit generally indicated at P and the test unit generally indicated at T. The power unit and the test unit are suitably connected by fluid lines L, these lines being of any necessary length, and provided with flexible sections as necessary in order to make any proper connection between the power and test units, it being understood that the power unit may be mobile or portable and its position with respect to the derrick thus subject to variation depending on circumstances existing at a particular well. The power unit may be some distance away from the well with appropriate lines L leading to the well. The principal element of the test unit is a connecting barrel B which is pivotally mounted on a supporting platform so that it may be aligned with the pipe stand S suspended in the derrick, and at the same time, by power means to be described, the barrel is rotated around its axis when contacted with the coupling threads at the lower end of the stand S to tightly secure the top of the barrel to the lower end of the pipe, there being no required movement of the pipe stand either axially or in rotation during the connection, the necessary turning and axial movements being performed by the barrel.

The interior of the barrel is thus sealed in communication with the lower end of the pipe stand, and fluid under pressure is pumped from the power unit to carry out the test.

The power unit comprises low and high pressure systems respectively for the purposes of initially rapidly filling the system and pipe stand by a pump designed to supply volume, and thereafter to test by a pump designed to rapidly build up pressure while supplying only a relatively small quantity of fluid to the system.

A source of low pressure fluid is shown at 10 (Figure 2) and this may be a tank or any similar source of water supply. The tank may be as large as necessary, depending on the capacity of the system, and it is carried on the same truck with the power unit. Water is pumped from the source 10 by a volume pump 12 (Figure 1), which is driven by the shaft of a suitable source of power such as a gasoline engine. A suitable manually operated clutch connection is provided between the engine and the pumps. It will be understood that any such engine may be employed without hazard as the power unit may be positioned at any distance from the well as safety requirements dictate. Between the source of water and the pump 12 is a conduit 14, and in this conduit in the order named there may be provided a gate valve 16 and a purifying screen 18. The pump 12 discharges the water into a conduit 20, and in this conduit there is provided a check valve 22 of any appropriate construction, which valve passes the volume of water as just described, but which closes against pressure built up in the barrel and the pipe being tested in a manner hereinafter described. If desired, a low pressure relief valve 24 may be provided in the line 20 between the volume pump and the check valve for obvious purposes. With the arrangement just described, the pipe section S being tested may be rapidly filled with water to its capacity.

While I prefer to use a single source of supply for both high and low pressure pumps, I show as a modification the use of a separate line 30 which may lead from any appropriate source of water, such as a water main or tank. This line leads to a displacement or high pressure pump 31 which is simultaneously driven from the engine 13 of the power unit by any suitable connections, with clutch arrangements as desired. I have found it practicable to drive the high pressure pump 31 from the same shaft 32 which drives the low pressure pump, through the pulley and belt drive 33, which turns a short shaft having cams thereon to reciprocate pistons in the high pressure pump 31. A gate valve 36 may be provided between the source of water and the high pressure pump. There is a discharge line 40 leading from the high pressure pump and this line joins the line 20 leading from the lower pressure pump 12 at a T 42, and a common conduit 44 leading from this T connects with the flexible lines L which lead to the test unit. In the line 40, and in the order named from the displacement pump toward the test stand, there is a bleeder line 46 controlled by a plug valve 48, a high pressure gauge 50 having a needle valve or choke bean 52 in the entrance thereto, and a high pressure relief valve 54.

It will be understood that after the pipe S has been filled with liquid by the volume pump 12, continued operation of the displacement pump 31 (both pumps are simultaneously operating at all times) will force a relatively small quantity of water into the line L and thence to the barrel B and pipe section S, and the pressure within the pipe S (which is closed by suitable means at its upper end) will rapidly build up to the proper test, as indicated by the gauge 50 in the power unit. In the usual manner, if the gauge 50 indicates that pressure is being held at test pressure or above, it will be known that the pipe section is in good condition. If the gauge indicates that the pressure does not hold or if leaks are visible, it will be known that the pipe or its connection should be rejected. The relief valve 54 is properly set to vent liquid from the system at test pressure or above.

The low pressure water pump fills the circuit, including the tubing, with liquid. The high pressure pump is, at the same time, injecting about one cubic inch of liquid into the line on the far side of the check valve leading to the testing unit. When pressure is built up in the system beyond the check valve, it closes, and continued operation of the high pressure pump is effective toward the test stand and also to maintain the check valve closed. Continued operation of the low pressure pump will now be of no effect, and liquid pumped by it can be relieved through the valve 24, and back to the source of liquid supply by a pipe (not shown) from the valve 24.

Having tested a section of pipe, the high pressure may be relieved from the line 40, line L, barrel B, and pipe section S by an operation at the power unit, by a service operator at that point rather than on the derrick floor. That is, plug valve 48 is opened to relieve the high pressure from the system, and thereafter the derrick crew at the test stand can drain and remove the section of pipe S, and stack it in the derrick, or, if unsatisfactory, mark and set it aside, after which a new section is inserted into the test stand and operations are repeated.

In order to drain the system, a valve 60 is provided in a line 62 leading from the interior of the barrel B, and this is opened to rapidly drain the system.

The valve 48 may be a small and therefore cheap high pressure valve, while the valve 60 may be a larger low pressure valve adapted to be turned easily at low pressure yet leak-proof against high pressure and difficult to turn when the pressure in the system is high.

It will be obvious that certain variations of the piping and valve arrangements may be found to be practical, particularly of the power unit. It is preferred to use a system designed for operation from only a single source of water, such as the source 10. In such a system, a branch pipe 72 is connected into the line 20 between the volume pump 12 and the check valve 22, thus drawing its liquid through the volume pump. This arrangement avoids the presence of air in the liquid supplied to the high pressure displacement pump 31. It will be understood that in this preferred system, the pipe 30 and the valve 36 will not be present, the pipe 72 connecting directly with the inlet side of the pump 31 with no branch lines connecting with the pipe 72.

A non-preferred variation of the above might include the parts shown in dotted lines in Figure 1, comprising a pipe 66 leading from a fitting 68 on the inlet side of the volume pump 12 and connecting with a collar 69 located on the inlet side of the displacement pump 31. This branch line 66 may have therein, in the order named, a stop valve 70 and a cleaning screen 71. In this variation of the system, the valve 36 and the pipe 30 would not be present, or at least would not be used.

In both of the systems just described, the volume pump 12 fills the system in the manner described, while the displacement pump, simultaneously operating, draws liquid from the same source and forces it through the high pressure line 40 and thence to the barrel B and pipe section S as previously described.

Figures 2, 4:
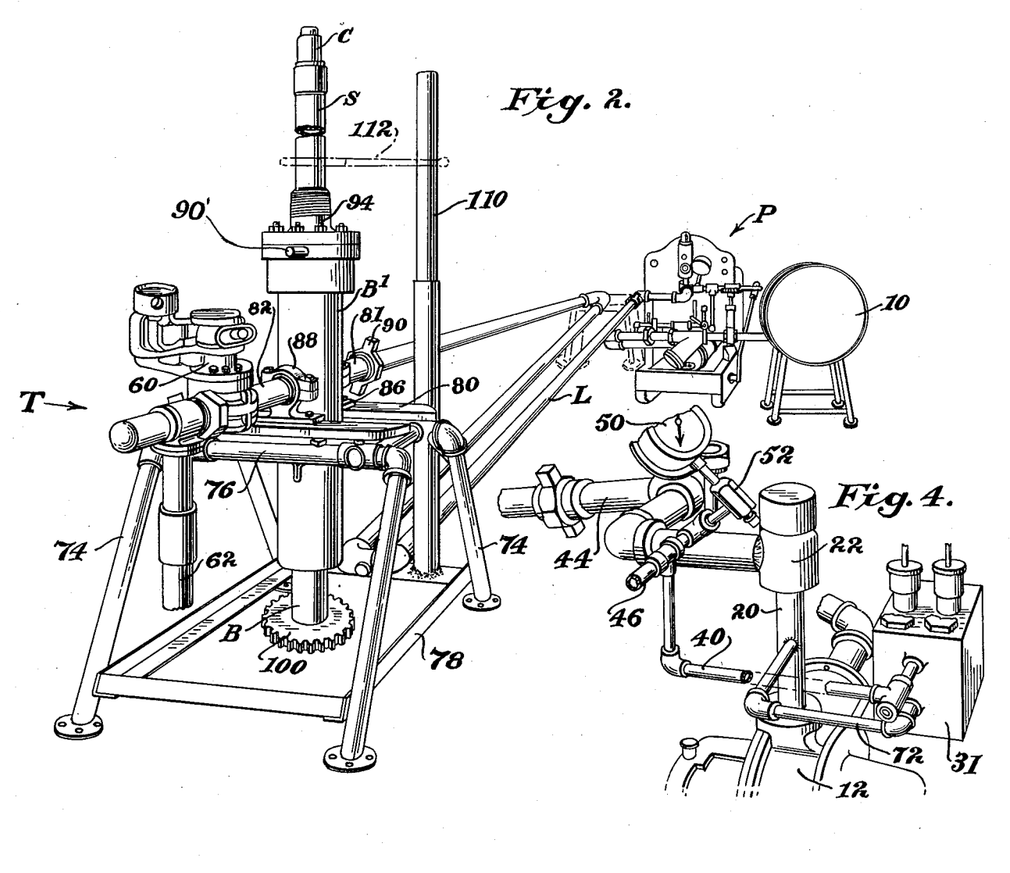
Figure 2 is a perspective view of the actual apparatus while being positioned and assembled adjacent a well.
Figure 4 is a perspective view of a portion of the fluid system.
Figure 3:
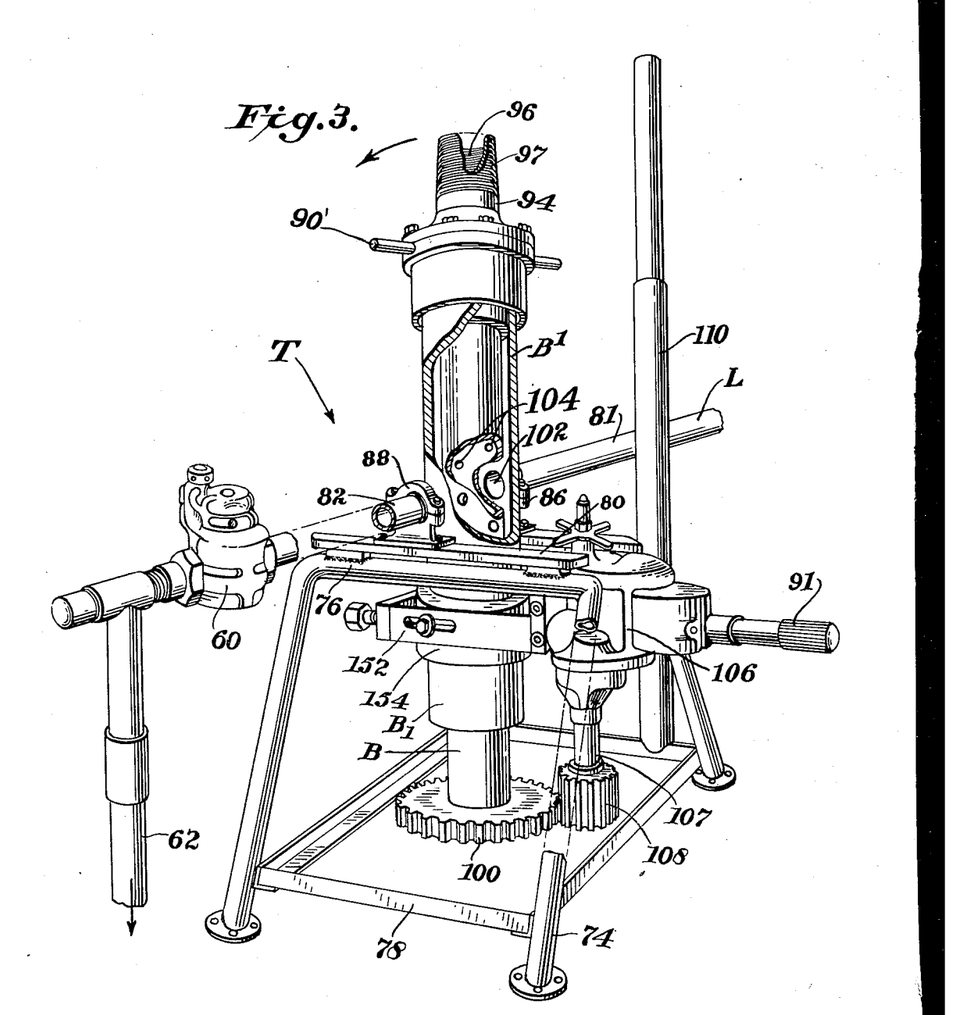
Figure 3 is an enlarged perspective view of the test unit.

The general construction of the testing unit is best illustrated in Figures 2 and 3. The unit is supported on a platform including a pair of pipes bent to form inclined corner supporting legs 74 connected by top cross bars 76, the legs being provided with suitable strengthening and connecting horizontal members 78, while top plates 80 are welded or secured in any other suitable manner to the top bars 76, which bars are spaced from one another as indicated. The inner connecting barrel B of the testing unit is surrounded by an outer cylindrical barrel or sleeve B¹, and opposite short pipe sections 81 and 82 (Figure 2) are welded to opposite sides of the outer barrel B¹ in alignment with one another, section 81 serving to convey the liquid into the cylinder B¹ and thence into the barrel B as hereinafter described, whereas section 82 will relieve water from the barrel to the outlet 62. Pipe section 81 is supported for turning movement in a suitable split bearing 86 fixed on one of the top plates 89 of the frame, while pipe section 82 is similarly rotatably supported in an opposite split bearing 88 fixed on the other top plate 89, as shown in Figure 2. The cylinder B¹ and its inner barrel B may be pivoted in the bearings 86 and 88, to align the upper end of the barrel B with the pipe to be tested.

A flexible swivel joint 90 (Figure 2) is provided at the outer end of the pipe section 81 where it connects with the first length of the connecting conduits L, so that turning movement of the pipe 81 is permitted. Joint 90 may be of any well known form suitable for this purpose which permits the turning of one pipe member with respect to a connecting pipe member, while maintaining a high pressure seal. If the discharge pipe 62 connects with further pipe lines which are rigid in their mounting, a similar flexible joint may be provided at the outer end of the pipe section 82, but if the water is permitted to discharge immediately adjacent the test unit, the pipe section 62 and the pump 60 may be permitted to turn or move with the barrel B when the latter is pivoted, and no such flexible joint will be necessary. As indicated in Figure 1, there may be a return pipe R from pipe 62 back to the source of supply beyond the inlet valve 16, or to the tank 10.

As shown in Figure 3, the upper end of the barrel B is rigidly connected with the flanged adapter 94, this adapter being interiorly threaded as at 96 with threads designed to tightly engage the threads 132 on the lower end of the tubing to be tested. The adapter may also have exterior threads 97, if desired, so that additional selected adapter collars may be screwed onto the threads, these adapter collars having outer ends interiorly threaded respectively to connect with the threaded ends of tubing of various sizes. By means to be later described, and through a gear 109 removably keyed onto the lower end of the barrel B, the barrel is rotated, thus rotating the threaded adapter 94 to connect it onto the lower end of the pipe section to be tested.

It will be obvious that various means may be provided for driving the inner barrel, including various kinds of fluid drives. It will be understood that the barrel B will first have been aligned with the pipe section by moving it in its pivots 86 and 88. As shown in Figure 3, the inner end of the pipe 81 opens as at 102 to the interior of the tube B¹, and in the wall of the barrel B, there are a number of holes 104 through which this water may pass in order that it may flow upwardly through the barrel and into the pipe section being tested.

Figure 3 illustrates the removable mounting on the platform of a hydraulic or pneumatic motor assembly 106 which carries a depending shaft 107 and gear 108 which meshes with the gear 109 on the lower end of the barrel B. By this means, the upper end of the barrel is threaded to the pipe section, and as the threads 96 engage with those of the pipe section, the barrel B is raised slightly through the tube B¹ to permit the threads to engage, the gears 108 and 109 still remaining in mesh because of the greater length of gear 108 as shown.

In Figure 2, the tubing stand or section is shown broken away so that the upper end thereof can be indicated, and a check valve plug C is threaded into the upper end of the tube stand in a manner hereinafter described.

There is a fixed post 110 extending upwardly and rigid with the frame of the testing outfit, the post being high enough to extend above the lower end of the pipe section S when the latter is connected. In effecting the screw threaded connection between threads 96 of the barrel and those on the lower end of the pipe section, a wrench or tongs 112 may be properly gripped about the pipe S, and when the barrel B is rotated, this wrench swings around with the pipe and its handle engages the upright post 110 to thereafter prevent further turning movement of the pipe stand in order to cause the top of the barrel to thread to the pipe. When unthreading the barrel from the pipe, the wrench is oppositely gripped onto the latter and engages the post from the opposite side, as will be understood in the art. As an alternative, the fixed post may have an appropriate socket adjacent its upper end in which the handle end of the wrench may be rigidly or loosely maintained, with its jaw portions gripping the pipe to retain the same against turning as previously described.

Figures 5, 6:
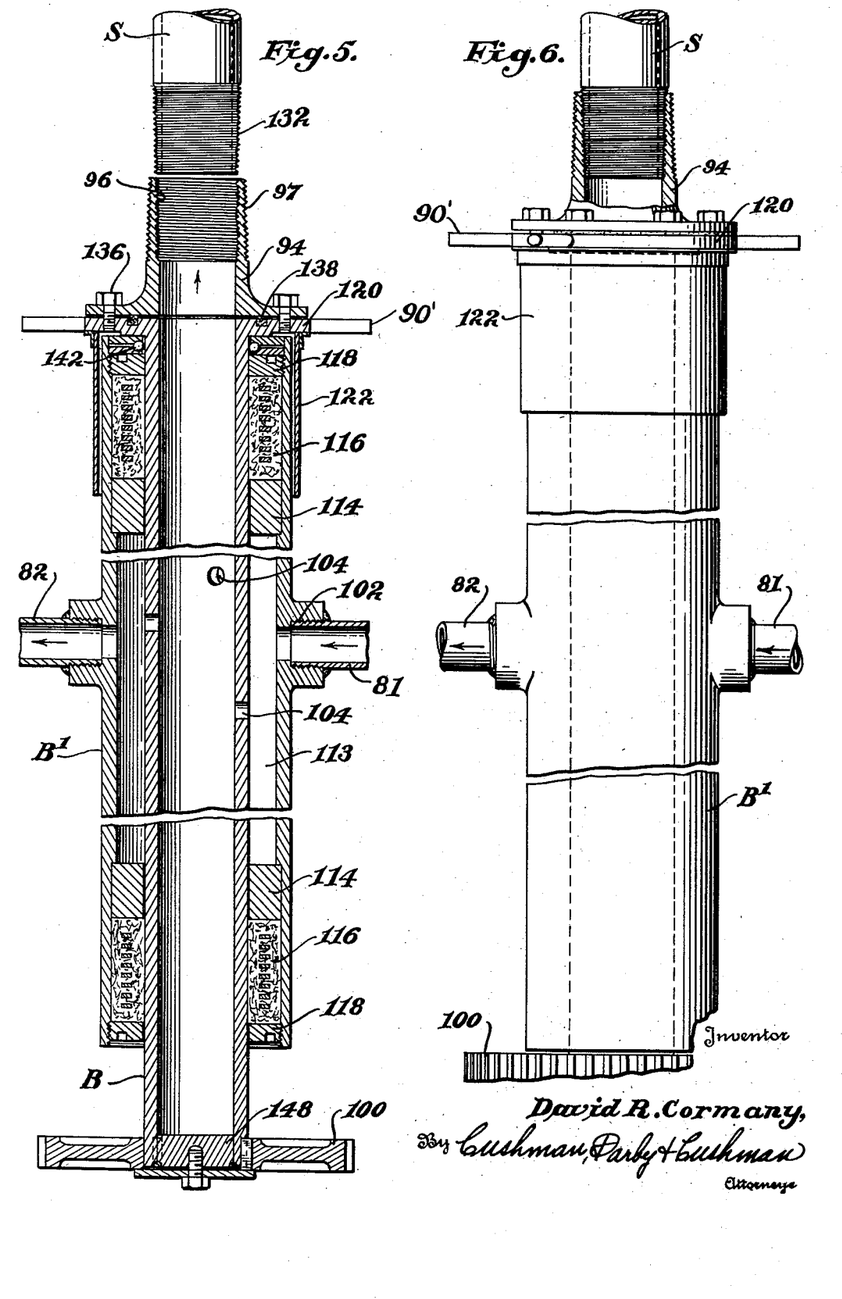
Figure 5 is a vertical sectional view of the barrel members of the testing unit, showing the connecting barrel in initial position preparatory to connecting with the tubing.
Figure 6 is a side elevational view of the barrel members of Figure 5, partly in section, showing the inner or connecting barrel in position after the connection with the tubing stand is effected.

The construction of the barrel unit is best disclosed in Figures 5 and 6. The outer cylindrical shell or barrel B¹ forms a chamber 113 in which the inner barrel B is concentrically positioned, the upper and lower ends of the barrel being closed by rings 114 which engage shoulders as shown, there being any form of suitable packing 116 beyond the rings, and suitable retaining ring-like nuts 118 threaded into the upper and lower ends of the outer barrel. The upper end of the barrel B has an outwardly extending flange 120 which projects out over and beyond the upper end of the barrel B¹, and a cylindrical depending skirt 122 is secured to the lower face of the flange 120 to shield the upper end of the outer barrel. The flange or collar 120 may be provided with oppositely disposed hand-engaging members 90' for manually rotating the barrel or casing B¹. It will be understood that the inner barrel B is designed to turn within the outer barrel and the packing just described, and is capable of limited upward and downward movement within the barrel B¹ for purposes as now described.

Secured to the upper face of the flange 120 is the flange of the adapter 94, said adapter or a further adapter-collar attached thereto having interior threads 96 designed to connect with the threads 132 on the lower end of a section of tubing S, as shown in Figure 5. In other words, the adapter 94 has a threaded extension which assumes the position of the usual tubing collar employed to connect sections of tubing together. The flange of the adapter 94 is secured to the flange 120 in any suitable way, as by bolts 136 and a packing ring 138 may be provided between the flanges to maintain a tight seal.

Appropriate anti-friction means should be provided between the inner and outer barrels to accommodate the relative turning movement between the same, while permitting relative longitudinal or axial movement, and I have indicated this means generally at 142.

In Figure 5, the fixed pipe sections 81 and 82 are shown entering openings in the outer shell B¹. These sections are threaded in said openings and may be welded there to more rigidly secure them.

The lower end of the barrel B is closed by a disk 148, which may be welded in place, and the driven gear wheel 100 is shown removably keyed to the inner barrel B.

Referring to Figure 3, a yoke 152 is shown secured to a sleeve 154 attached to the outer barrel, this yoke serving as the support for the hydraulic or pneumatic motor unit 106 which is thus removably attached to the outer barrel, said motor having the depending shaft 107 which drives the inner barrel B as previously described.

Referring to Figures 2 and 3, it will be understood that by properly positioning the test unit on the derrick floor, the vertical barrels of the latter may be tilted in their bearings 86 and 88 to align the threads 96 of the adapter 94 with the lower end of the stand of pipe suspended in the derrick, the barrels being pivoted so that the weight above the pivot is substantially equal to that below the same. When the adapter is thus aligned with the pipe, the latter is lowered until its threads 132 engage the threads 96 of the adapter. Thereafter, and unlike prior practices, it is unnecessary to further move the section of pipe. The operator then starts the pneumatic motor 106, and through gears 108 and 100 the inner barrel B is turned to cause the adapter to thread itself onto the lower end of the section of tubing. As the threads engage, the barrel B lifts itself through the packing on the interior of the outer barrel B¹, the barrel B, flange 120, adapter 94, and depending skirt 122 moving upwardly to the position shown in Figure 6 where the threads are completely engaged. It will be understood that the motor 106 may have suitable controls in order to rapidly spin the inner barrel initially, and to impart positive turning movement toward the end of the threading operation to screw the joint up tightly, this all being under the control of an operator who will have the feel of the engagement of the threads as he views them and operates the motor, just as one has when using conventional hand tongs. As stated before, hand tongs are used to retain the pipe section S against turning, by connecting the tongs or a wrench in the proper manner and permitting it to be held against movement by the upright post 110. If desired, suitable means may be provided to manually lift the inner barrel B through the outer barrel a short distance to engage the threads of the adapter with those of the tubing, such as a foot lift lever engaging the bottom of the barrel B, but I do not regard such an arrangement as being essential.

It will be understood that the motor 106 may be operated in reverse to unthread the adapter from the tubing stand while the latter is held suspended and stationary in the derrick.

When the barrel B is threaded to the section of pipe S as just described, and with the parts in the position shown in Figure 6, the power unit P is operated to first supply the necessary volume of water through the pipe 81 to the chamber 113 and through ports 104 to fill the barrel B and the pipe stand S. The check valve plug C (Figure 2) will have previously been connected into the upper end of the tubing stand, as later described, and as the water rises in the pipe air is permitted to escape through the valve C, but when water fills the pipe S, the low volume pump is no longer effective and further pressure to the confined fluid is applied by the high pressure pump, thus closing the valve C and building up test pressure within the pipe, all as previously described. When the testing operation has been completed, the high pressure bleeder valve 48 may be opened to relieve pressure in the system, after which the water may be drained by gravity from the system through the valve 60 and discharged onto the ground, or returned to a supply tank, if one is used. The air motor is operated in reverse to unthread the stand of pipe. The tested pipe is set aside and operations are repeated for subsequent sections.

Figures 7, 8, 8A:
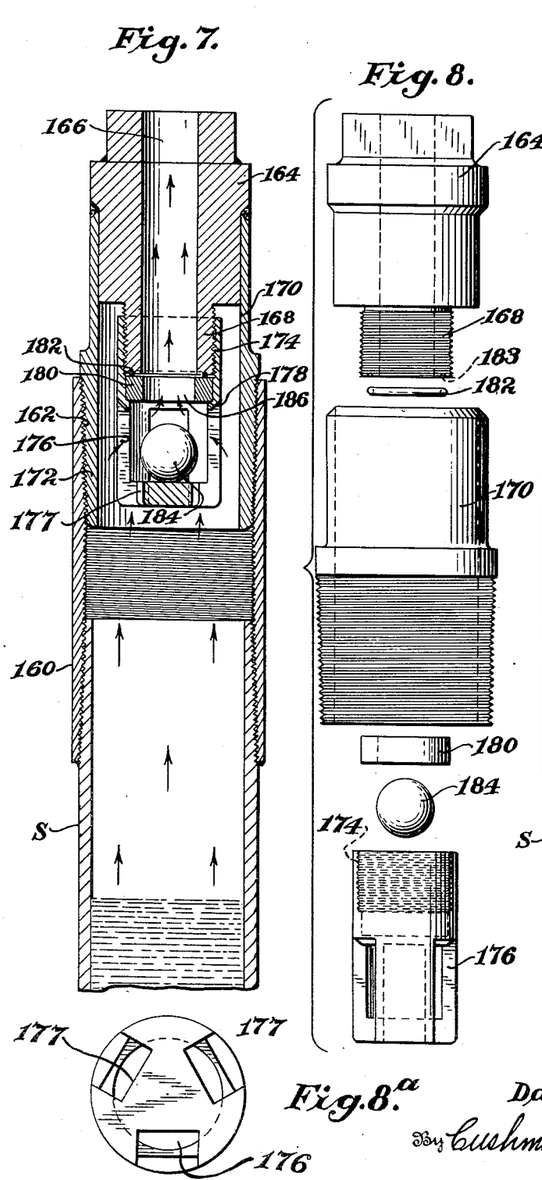
Figure 7 is a vertical sectional view of the automatic valve attached into the upper collar of the tubing being tested, with the valve member unseated.
Figure 8 is a side elevational view of the automatic tubing valve, with the components thereof separated from one another.
Figure 8a is a bottom plan view of the cage member 174.
Figure 9:
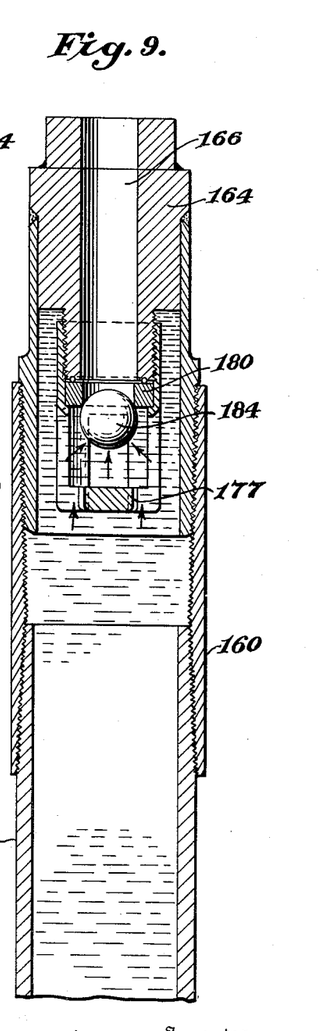
Figure 9 is a view similar to Figure 7, with the valve member seated by the action of the testing fluid.

In Figure 7, 160 designates an ordinary tubing collar which is connected with the upper end of a section of the tubing S, this collar having conventional interior threads 162 designed to receive the lower threaded end of the tubing. A novel valve assembly is threaded into the upper end of the collar, same comprising a block 164 having a central restricted passage 166 therethrough, the block having a depending central cylindrical attaching portion 168 which forms a lower continuation of the passage 166. The outer surface of the block is reduced, as shown, and a sleeve 170 is welded thereto, said sleeve including a depending portion 172 exteriorly threaded to engage the threads 162 of the tubing collar. It will be understood that when the threads become worn, the sleeve 170 may be replaced, thus making it unnecessary to discard the remaining parts of the valve assembly. Threaded onto the depending portion 168 of the block 164 is a valve cage having an upper threaded section 174 and a lower section having spaced radial slots or openings 176 therein. The slots 178 extend down through the bottom plate of the cage, and to points 177 within the inner wall of the cage (Fig. 8a). The cage member has an interior shoulder 178 above the slots 176 which engages a metal valve seat ring 180 of rectangular cross section, there being a rubber ring 182 fitting in a groove 183 in the lower face of the depending portion 168 and which engages the ring 180. When the cage member is screwed up snugly on the depending sleeve 168 the rubber ring 182 will fill any openings beyond it by fluid pressure from within to effectively seal against a leak. There is a ball valve 184 within the cage having a diameter greater than the diameter of the opening 186 through the steel ring 180. It will be understood that when the water is rising in the tubing section as indicated in Figure 7, air can escape through the outlet 166. When the tubing is filled with water as in Figure 9, and when pressure is exerted on the water by the high pressure pump, the ball 184 rises and engages the seat 180, thus tightly closing off the top of the tubing. The valve assembly may be threaded into the upper end of the adapter 96 when the equipment is not in use, or to test the system when not attached to a pipe stand, and two or more of the valve assemblies may be provided for each test unit so that one may be threaded into the open end of the top section of tubing in the well while another is in use in the stand suspended in the derrick.

It will be apparent that I have provided a novel apparatus and method for testing pipe, and which is particularly useful in testing such pipes as they are being removed from an oil well. The test unit may be positioned in the derrick or adjacent thereto, and is simple enough to be operated by the regular oil well crew. The power unit may be arranged in any convenient assembly, such as on a portable truck, and may be disposed at any distance from the well found to be safe or convenient. The engine, valves, and other parts of the power unit may be attended by specialized operators who accompany the service truck carrying the power unit. As previously described, the high pressures are under the control of the operator at the power unit, and when the men at the derrick are making or breaking connections, pressures have been relieved by appropriate operations of valves at the power unit. It will further be apparent that no hard manual labor is involved in making the various connections, and no movements of heavy strings of pipe are required to effect the connections or to carry out the tests, the pipe sections S being merely retained in a stationary position while connections are being made. Due to the provisions for convenient alignment of the barrel B with the pipe stand, galling and wearing of the connecting pipe threads is prevented.

When the test unit has been connected with the tubing stand an appropriate lever is thrown at the power unit connecting the volume pump and the high pressure pump with the engine, and under control of the engine throttle, the low pressure pump 12 forces fluid through the check valve 22 and into the tube S. When the tube S has been completely filled, the continued operation of the high pressure pump 31 builds up pressure in the pipe S and in the connecting lines L, and this pressure immediately closes the check valve 22. Continued operation of the volume pump 12 will cause the opening of the low pressure relief valve 24 so that said valve will discharge water from the system, but suitable pipe connections may be provided to return this discharged water to the tank 10 or other source of supply, so that the volume pump 12 merely idles rather than performing its usual work after the check valve 22 closes. As stated above, continued operation of the high pressure displacement pump 31 builds up pressure in the system to the desired degree, and this is indicated on the high pressure gauge 50. When the pressure reaches the desired degree without leakage, the operation of the high pressure pump may be discontinued by throwing out a suitable clutch of the engine assembly, and if this pressure is held, it is indicated that the pipe stand S including the threads at the lower end thereof and both sets of threads of intermediate collars and in the collar at the upper end thereof are in satisfactory condition. It will be understood that continued operation of the pump 31 will cause no dangerous condition, as the relief valve 54 may be adjusted to relieve high pressure from the line at any predetermined pressure. In order to avoid releasing water at high pressure at the test unit or on the derrick floor, the plug valve 48 in the power unit may be opened to bleed the high pressure line through the discharge passage 46, and when pressures are down to normal, liquid may be drained from the system as desired by operation of the valve 69 at the test unit. If desired, suitable connections may be provided to return the liquid drained out to the supply tank 10 or other source of water, as indicated generally at R in Figure 1.

As mentioned above, there may be numerous changes in the arrangement of the power unit. The preferred manner of supplying water to the high pressure system is from the same source 10 as is used by the low pressure system. The connecting line 66 with its valve 70 and screen 71 (Figure 1) is a suggested variation of the preferred simple line connection 72. In any event, my apparatus comprises a system or pumping means for filling the pipe to be tested with a body of water, and a system or pump which thereafter applies pressure to the filled system or pipe to carry out the desired test.

It will be understood that the parts at the top of the test unit may be modified in order to accommodate pipes of various sizes and types, including drill pipe and casing. While I have shown the barrels of the test unit pivoted only about one axis, as this will suffice when the unit is properly positioned with respect to the suspension means in the derrick, the barrels may also be pivoted about a second axis at right angles to that shown in order to more readily adjust it for connection with pipe sections in various positions, if this is found to be desirable.

It will also be understood that other means might be provided to connect the upper end of the barrel of the test unit with the tubing and which might not involve rotation of the barrel, although the method I have disclosed is preferred in that it uses the conventional screw thread connecting means with which ordinary tubing is provided.

While the pumps 12 and 31 are intended to be cut in by a common clutch from the engine and operated simultaneously, it will be obvious that mechanism could be provided to cut in the high pressure pump by hand, or automatically, when the system is filled with water by the low pressure pump.

It will be understood that various liquids may be used for testing the pipes as described herein, including oil and water. I have found that water mixed with soluble oil will provide a liquid white in color which is useful in clearly indicating leaks in the pipe or couplings being tested.

Figure 10:
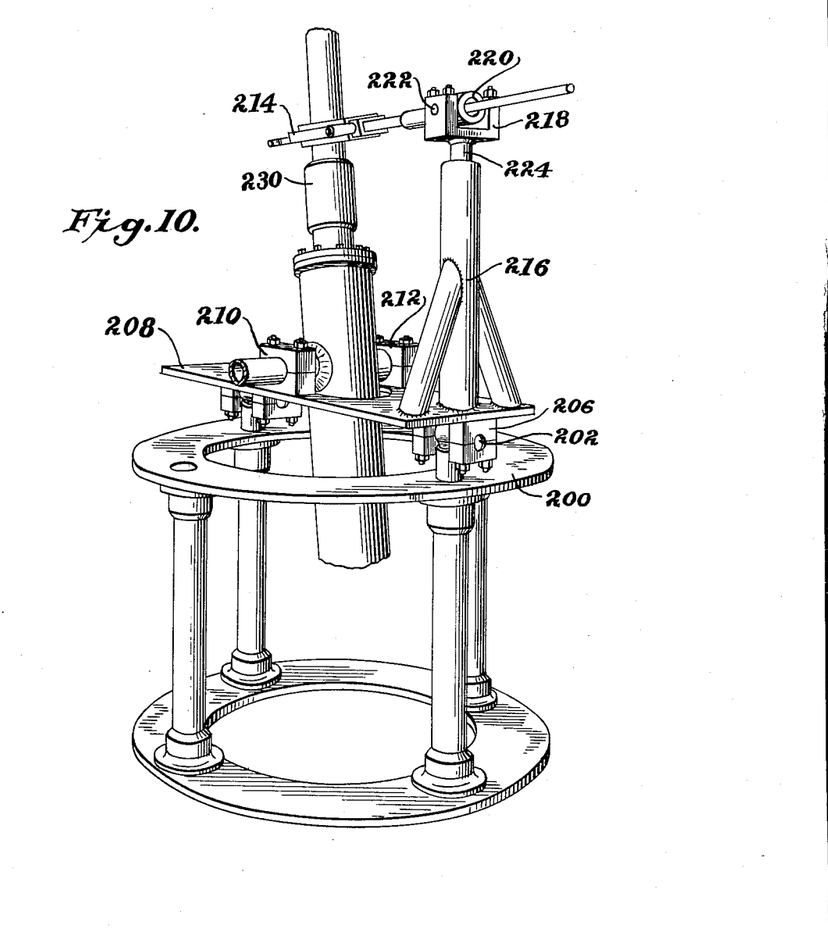
Figure 10 is a somewhat diagrammatic view, showing a modification wherein the testing barrel may be mounted for tilting adjustment about two axes.

As stated above, it may be desirable to mount the barrels B and B¹ for tilting movement in any direction, and this can be accomplished by suitable modification of the apparatus shown in Figure 3. Such a modification is indicated in Figure 10, wherein the table plates 80 of Figure 3 are replaced by a relatively large ring plate 200. This plate is provided with opposite upwardly extending posts which carry radial pins 202. These pins serve to pivot bearings 206 on opposite ends of a plate 208. The barrel B¹ passes through a central opening in the plate 208, and on opposite sides of this opening the plate carries bearings 210 and 212, in which the barrel B¹ is pivoted, these bearings corresponding with 86 and 88 of Figure 3. It is obvious that with the above construction, the barrel can be tilted around two axes and thus in any direction.

Figure 10 also illustrates an arrangement for supporting the tongs 214 in position to grip the tubing collar when connecting the tubing to the testing apparatus. The support comprises a post 216 on the plate 208 having a top bracket 218 in which a tube 220 is pivoted on pins 222 in the bracket. The handle of the tongs is carried in the tube 220 as shown. The bracket 218 is carried on a rod 224 which is movable up and down in the hollow cylindrical interior of the post 216, there being provided any suitable means for locking rod 224 against coming out.

The tongs can thus be adjusted vertically, moved in and out through 220, pivoted at points 222, and turned by turning the bracket 218, which may be pivotally mounted on rod 224.

This figure also shows the use of an adapter-collar 230 which connects with the threads 91

(Figure 3) and has an interiorly threaded end of size to fit the end of the tubing to be tested.

I claim:

1. Apparatus for testing pipe having a remote end closed against discharge of the testing fluid and a threaded near end, comprising a pedestal, an outer barrel mounted on said pedestal having an inlet opening communicating with a conduit leading from a source of testing fluid, an inner barrel mounted in said outer barrel and extending beyond one end thereof, said inner barrel having an opening at a point within said outer barrel establishing communication between the interiors of said barrels, packing means between said barrels which permit both turning and axial movements of said inner barrel while maintaining a pressure tight chamber for the testing fluid constituted by said barrels, the extending portion of said inner barrel having a threaded outlet opening in its end arranged to engage the threads on the near end of said pipe, and means on said inner barrel for the application of power to turn the same around its axis and with respect to said outer barrel to effect the threaded connection with the near end of said pipe 2. A construction in accordance with claim 1 wherein said outer barrel has a discharge opening and an associated valve to drain said chamber after the pipe has been tested.

3. A construction in accordance with claim 1 wherein said outer barrel is pivotally mounted on said pedestal in substantially upright position with said inner barrel extending beyond the upper end of said outer barrel.

4. A construction in accordance with claim 1 wherein the end of the extending portion of said inner barrel is formed to connect with a removable adapter which carries said outlet opening and associated threads.

5. A construction in accordance with claim 1 wherein said inner barrel extends beyond both ends of said outer barrel, said power application means being on the opposite end of said barrel from its extending portion which carries the outlet opening.

6. Apparatus for testing closed chambers comprising a volume pump and a pressure pump each having inlet connections with supply pipes leading from a source of testing fluid, a conduit system leading to the chamber to be tested, engine means for driving said pumps, each of said pumps having an outlet and discharge pipes which connect with said conduit system and chamber, said volume pump being designed to supply a relatively great volume of fluid to the conduit system and the chamber in a relatively short period of time, said pressure pump being designed to apply pressure to the fluid in the chamber when filled by the introduction of a relatively small volume of fluid into said chamber, a check valve in the discharge pipe from said volume pump which permits passage of fluid when the chamber being tested is being filled with fluid but which closes against return flow when the chamber is filled with fluid and when pressure is applied to this fluid by the pressure pump, and a low pressure relief valve in the discharge pipe between said volume pump and said check valve which is adjusted to release the fluid pumped by said volume pump when the chamber is filled and said check valve is closed under pressure of said pressure pump.

7. Apparatus in accordance with claim 6 wherein a pipe line is provided for said relief valve to the source of fluid whereby said volume pump returns the fluid to its source when said check valve is closed.

8. Apparatus in accordance with claim 6 wherein there is a high pressure bleeder valve in the discharge pipe from said pressure pump to reduce the pressure of the testing fluid after the test of the chamber has been completed.

9. Apparatus in accordance with claim 6 wherein said conduit system includes a bleeder valve, a drain valve adjacent the chamber to be tested, and which is adapted to be opened to drain the chamber after the opening of the bleeder valve, and in which said bleeder valve is in the discharge pipe from said pressure pump and adjacent thereto to reduce the pressure of the testing fluid in the chamber immediately after the test is completed.

10. Apparatus in accordance with claim 6 wherein said pressure pump draws its fluid from the discharge pipe from said volume pump between said volume pump and said check valve.

11. Apparatus for testing pipe by a testing fluid, said pipe having a remote end closed against discharge of the testing fluid and an opened near end, said apparatus including a pedestal, a sleeve pivotally connected to said pedestal, a barrel rotatably and axially movable in said sleeve, means for conducting testing fluid into the barrel, coupling means on one end of the barrel for detachably connecting the barrel to the near end of the pipe to be tested, and means for rotating and axially moving the barrel for connecting the coupling means to the pipe so as to introduce the testing fluid from the barrel into the pipe.

12. Apparatus for testing pipe by a testing fluid, said pipe having a remote end closed against discharge of the testing fluid and a threaded near end, said apparatus including a pedestal, a sleeve pivotally connected between its ends to said pedestal, a barrel rotatably and axially movable in said sleeve, means for conducting testing fluid into the barrel, threaded coupling means on one end of the barrel for detachably connecting the barrel to the threaded near end of the pipe to be tested, means for rotating and axially moving the barrel for connecting the coupling means to the pipe so as to introduce the testing fluid from the barrel into the pipe, and means on the pedestal for holding the pipe against turning movement when the threaded connection is being effected.

13. A construction in accordance with claim 11 wherein the means for conducting testing fluid into the barrel is positioned at the pivot point of the sleeve on said pedestal.

14. Apparatus for testing pipe by a testing fluid, said pipe having a remote end closed against discharge of the testing fluid and a threaded near end, said apparatus including a pedestal, a sleeve pivotally connected to said pedestal, a barrel extending axially into said sleeve and spaced therefrom to form a chamber, said barrel having at least one opening for communicating the interior thereof with said chamber, means between the ends of the sleeve and the barrel for closing said chamber, threaded coupling means adjacent one end of the sleeve for connecting the barrel to the near end of the pipe to be tested, means for conducting testing fluid into said chamber and said barrel, and means for rotating and axially moving said barrel relative to the sleeve for connecting the coupling means to the near end of the pipe so as to introduce the testing fluid from the barrel into the pipe.

15. Apparatus for testing oil well pipe comprising a portable test unit said unit having a supporting pedestal, a sleeve pivotally connected to said pedestal, a test barrel rotatably and axially movable in said sleeve and arranged to connect with a stand of pipe suspended from the derrick, a portable power unit adapted to be positioned at some distance from the derrick and including pumping means communicating with said barrel to fill the pipe with fluid and then to apply test pressure to the fluid, and said units being connected by a flexibly arranged conduit system for the fluid.

16. Apparatus for testing pipe by a testing fluid, said pipe having a remote end closed against discharge of the testing fluid and an opened near end, said apparatus including a supporting means, a sleeve movably mounted on said supporting means, a barrel movably mounted in said sleeve, coupling means on one end of said barrel for detachably connecting said barrel to the near end of the pipe to be tested, means to move said barrel to connect said coupling means to the pipe to be tested, a volume pump and a pressure pump, each having inlet connections with supply pipes leading from a source of testing fluid, a conduit system leading to said sleeve, engine means for driving said pumps, each of said pumps having an outlet and discharge pipes which connect with said conduit system, said volume pump being designed to supply a relatively great volume of fluid to said conduit system, barrel and the pipe being tested in a relatively short period of time, said pressure pump being designed to apply pressure to the fluid in the sleeve and pipe being tested by the introduction of a relatively small volume of fluid, a check valve in the discharge pipe from said volume pump which permits passage of fluid when the pipe being tested is being filled with fluid but which closes against return flow when the pipe being tested is filled with fluid and when pressure is applied to this fluid by said pressure pump, and a low pressure relief valve in the discharge pipe between said valve which is adjusted to release the fluid pumped by said volume pump when the pipe being tested is filled and said check valve is closed under pressure of said pressure pump.

17. Apparatus in accordance with claim 16 wherein a pipeline is provided for said relief valve to the source of fluid whereby said volume pump returns the fluid to its source when said check valve is closed.

18. Apparatus in accordance with claim 16 wherein there is a high pressure bleeder valve in the discharge pipe from said pressure pump to reduce the pressure of the testing fluid after the test on the pipe has been completed.

19. Apparatus in accordance with claim 16 wherein said conduit system includes a bleeder valve, a drain valve adjacent the pipe to be tested, and which is adapted to be opened to drain the chamber after the opening of the bleeder valve, and in which said bleeder valve is in the discharge pipe from said pressure pump and adjacent thereto to reduce the pressure of the testing fluid in the pipe immediately after the test is completed.

20. Apparatus in accordance with claim 16 wherein said pressure pump draws its fluid from the discharge pipe from said volume pump between said volume pump and said check valve.

DAVID ROSS CORMANY.

REFERENCES CITED

The following references are of record in the file of this patent:

UNITED STATES PATENTS

| Number | Name | Date |
| --- | --- | --- |
| 1,119,980 | Mulligan | Dec. 8, 1914 |
| 1,611,458 | Kempkey | Dec. 21, 1926 |
| 1,613,150 | Zore | Jan. 4, 1927 |
| 1,667,877 | Star | May 1, 1928 |
| 1,811,138 | Lassman | June 23, 1931 |
| 1,973,674 | Rosenkranz | Sept. 11, 1934 |
| 2,135,721 | Landenberger | Nov. 8, 1938 |
| 2,216,268 | Fritsche | Oct. 1, 1940 |
| 2,231,807 | Hybarger | Feb. 11, 1941 |
| 2,310,974 | Lumm | Feb. 16, 1943 |
| 2,364,709 | Greer | Dec. 12, 1944 |

FOREIGN PATENTS

| Number | Country | Date |
| --- | --- | --- |
| 712,308 | France | Sept. 30, 1931 |